(12) United States Patent
Cimatti (10) Patent No.: US 10,011,163 B2
(45) Date of Patent: Jul. 3, 2018

(54) AUTOMATIC MANUAL TRANSMISSION FOR A HYBRID CAR PROVIDED WITH AN INTERNAL COMBUSTION ENGINE AND WITH AN ELECTRICAL MACHINE

(71) Applicant: Ferrari S.p.A., Modena (IT)

(72) Inventor: Franco Cimatti, Pavullo (IT)

(73) Assignee: Ferrari S.p.A., Modena (IT)

(*) Notice: Subject to any disclaimer, the term of this patent is extended or adjusted under 35 U.S.C. 154(b) by 292 days.

(21) Appl. No.: 15/172,387

(22) Filed: Jun. 3, 2016

(65) Prior Publication Data
US 2016/0355082 A1 Dec. 8, 2016

(30) Foreign Application Priority Data

Jun. 4, 2015 (IT) .................. 102015000020352

(51) Int. Cl.
*B60K 6/485* (2007.10)
*B60K 6/547* (2007.10)
*B60K 6/387* (2007.10)
*B60K 6/48* (2007.10)
*B60K 6/365* (2007.10)
(Continued)

(52) U.S. Cl.
CPC .............. *B60K 6/547* (2013.01); *B60K 6/365* (2013.01); *B60K 6/387* (2013.01); *B60K 6/442* (2013.01); *B60K 6/48* (2013.01); *F16H 3/091* (2013.01); *F16H 37/0806* (2013.01); *B60K 2006/4808* (2013.01); *B60K 2006/4816* (2013.01); *B60K 2006/4841* (2013.01); *B60Y 2200/92* (2013.01); *B60Y 2300/182* (2013.01); *B60Y 2300/91* (2013.01); *B60Y 2400/70* (2013.01); *B60Y 2400/80* (2013.01); *F16H 2037/045* (2013.01); *Y02T 10/626* (2013.01);
(Continued)

(58) Field of Classification Search
CPC .......................... B60K 6/48; B60K 2006/4825
USPC .............................. 74/661, 665 G; 180/65.25
See application file for complete search history.

(56) References Cited

U.S. PATENT DOCUMENTS 6,341,541 B1 * 1/2002 Sakamoto ................ B60K 6/36
   74/665 A
8,939,867 B2 * 1/2015 Cimatti .................. B60W 20/30
   477/5

(Continued)

FOREIGN PATENT DOCUMENTS

DE       102010030567 A1   12/2011
EP         2 682 293 A1     1/2014

*Primary Examiner* — Ha Dinh Ho
(74) *Attorney, Agent, or Firm* — Blank Rome LLP (57) ABSTRACT

An automatic manual transmission for a hybrid vehicle provided with an internal combustion engine and with an electrical machine. The automatic manual transmission has: a servo-assisted mechanical gearbox; a differential gear, which transmits the motion to driving wheels; a clutch; a servo-assisted drive device with a variable gear ratio; an auxiliary shaft, along which the electrical machine is mounted; a drive shaft connecting the differential gear to the servo-assisted drive device, which is arranged immediately downstream of the gearbox and directly receives the motion from a secondary shaft of the gearbox; a first connectable/disconnectable and servo-assisted connection device, which is suited to connect the auxiliary shaft to the drive shaft; and a second connectable/disconnectable and servo-assisted connection device, which is suited to connect the auxiliary shaft to the secondary shaft of the gearbox.

11 Claims, 12 Drawing Sheets

(51) Int. Cl.
  *B60K 6/442*   (2007.10)
  *F16H 3/091*   (2006.01)
  *F16H 37/08*   (2006.01)
  *F16H 37/04*   (2006.01)

(52) U.S. Cl.
  CPC ........ *Y02T 10/6221* (2013.01); *Y02T 10/6256* (2013.01); *Y10S 903/91* (2013.01); *Y10S 903/919* (2013.01)

(56) References Cited

U.S. PATENT DOCUMENTS

| | | | |
|---|---|---|---|
| 8,978,516 B2* | 3/2015 | Funk | B60K 6/36 74/665 A |
| 9,845,088 B2* | 12/2017 | Hoess | B60K 6/365 |
| 2002/0065163 A1* | 5/2002 | Deichl | B60K 6/40 475/5 |
| 2010/0311540 A1* | 12/2010 | Hellenbroich | B60K 6/40 477/5 |
| 2011/0167956 A1 | 7/2011 | Holmes et al. | |

\* cited by examiner

AUTOMATIC MANUAL TRANSMISSION FOR A HYBRID CAR PROVIDED WITH AN INTERNAL COMBUSTION ENGINE AND WITH AN ELECTRICAL MACHINE

TECHNICAL FIELD

The invention relates to an automatic manual transmission for a hybrid car provided with an internal combustion engine and with an electrical machine.

PRIOR ART

Patent application EP2682293A1 discloses an automatic manual transmission for a hybrid car provided with an internal combustion engine and with an electrical machine. This automatic manual transmission comprises: a gearbox, which is provided with a primary shaft and a secondary shaft; a differential gear, which receives the motion from the secondary shaft of the gearbox and transmits the motion to the driving wheels; a clutch, which is interposed between the secondary shaft of the gearbox and the differential gear; an auxiliary shaft, along which the electrical machine is mounted; a first gear train, which connects a first end of the auxiliary shaft, which is arranged upstream of the electrical machine, to the primary shaft of the gearbox; and a second gear train, which connects a second end of the auxiliary shaft, which is arranged downstream of the electrical machine, to an output shaft of the clutch. Moreover, the automatic manual transmission comprises a drive device with a variable gear ratio, which can be adjusted so as to have two different gear ratios and is arranged upstream of the primary shaft of the gearbox; in other words, the drive device is interposed between the crankshaft of the internal combustion engine and the primary shaft of the gearbox.

Patent application US2011167956A1 discloses an automatic manual transmission for a hybrid car provided with an internal combustion engine E and with an electrical machine M/G. This automatic manual transmission comprises: a servo-assisted mechanical gearbox G1-G4, which is provided with a primary shaft 18, which is suited to receive a torque from a drive shaft 15 of the internal combustion engine E, and a secondary shaft 20; a differential gear 52, which transmits the motion to driving wheels 56A/56B; a clutch 16; a servo-assisted drive device G5/G6 with a variable gear ratio, which is arranged immediately downstream of the gearbox G1-G4 and receives the motion directly from the secondary shaft 20 of the gearbox G1-G4; an auxiliary shaft 48, along which the electrical machine 46 is mounted; and a drive element, which connect the servo-assisted drive device G5/G6 to the differential gear 52.

The automatic manual transmission described in patent application EP2682293A1 or in patent application US2011167956A1 allows the electrical machine to fulfill, in an effective and energy-efficient manner, different functions (starting the internal combustion engine, generating electrical energy when the storage system needs to be charged, applying a torque to the driving wheels when an electrical drive is needed, and regenerative braking); however, when the car runs at a relatively high speed, both the electrical drive (namely, when the electrical machine generates a torque, which is transmitted to the driving wheels) and the regenerative braking (namely, when the electrical machine absorbs a braking torque, which is transmitted to the driving wheels) operate with an energy efficiency that is acceptable but not ideal (namely, relatively far from the maximum energy efficiency).

SUMMARY OF THE INVENTION

The object of the invention is to provide an automatic manual transmission for a hybrid car provided with an internal combustion engine and with an electrical machine, said automatic manual transmission not being affected from the drawbacks described above, being able to be manufactured in a straightforward and low-cost manner and, in particular, allowing the electrical machine to always operate with a high energy efficiency.

According to the invention, there is provided an automatic manual transmission for a hybrid car provided with an internal combustion engine and with an electrical machine, according to the appended claims.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
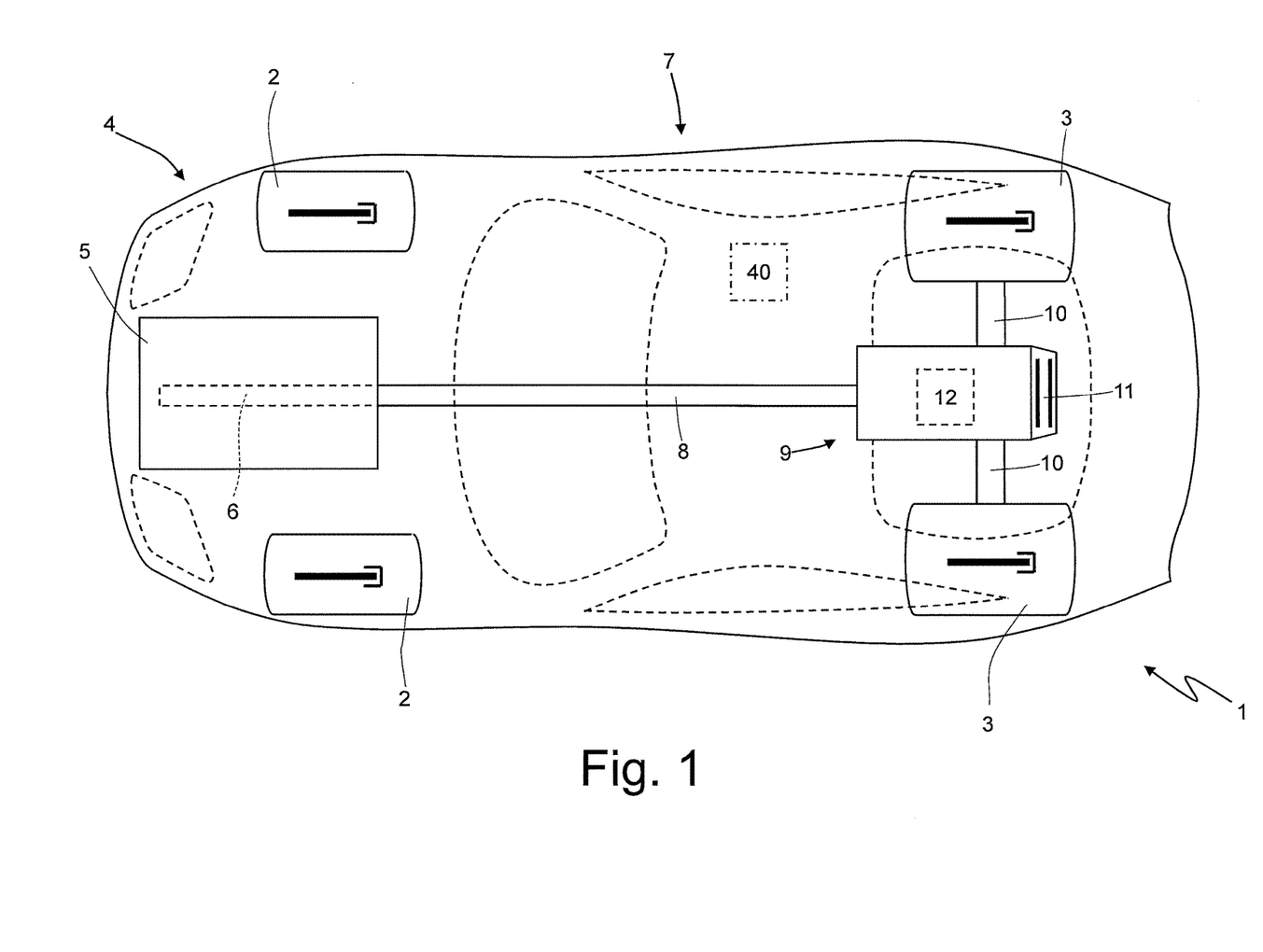
FIG. 1 is a schematic, plan view of a hybrid car provided with an automatic manual transmission according to the invention.

In FIG. 1, number 1 indicates, as a whole, a car provided with two front wheels 2 and two rear driving wheels 3, which receive the torque from a powertrain system 4.

The powertrain system 4 comprises an internal combustion heat engine 5, which is arranged in a front longitudinal position and is provided with a crankshaft 6, and an automatic manual transmission 7 (commonly called "AMT"), which transmits the torque generated by the internal combustion engine 5 to the rear driving wheels 3 and has the configuration referred to as "transaxle". The transmission 7 comprises a drive shaft 8, which, on one side, is connected to the crankshaft 6 and, on the other side, is mechanically connected to a gearbox 9, which is arranged in rear longitudinal position and transmits the motion to the rear driving wheels 3 by means of two axle shafts 10. The gearbox 9 is also coupled to a clutch 11, which is also arranged in a rear position and is housed in a bell fixed to the casing of gearbox 9.

As we will be better explain hereinafter, the powertrain system 4 comprises an electrical machine 12, which may be controlled to operate as a generator (by absorbing mechanical energy and supplying electrical energy) or as an engine (by absorbing electrical energy and supplying mechanical energy).

Figure 2:
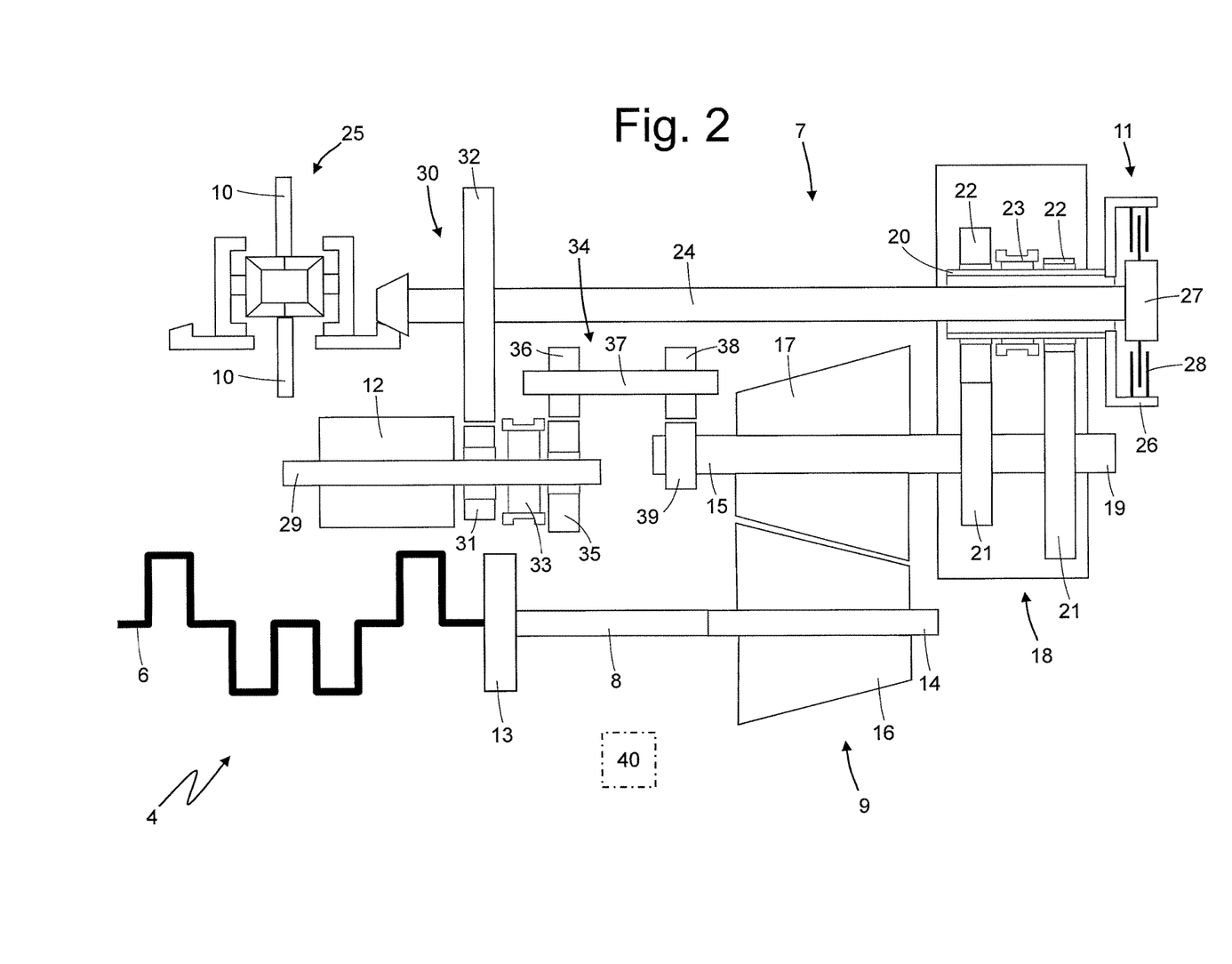
FIG. 2 is a schematic view of the automatic manual transmission of FIG. 1.

According to FIG. 2, the engine of the internal combustion engine 5 is provided with a flywheel 13 (typically a cushioned dual-mass flywheel), which is interposed between the crankshaft 6 and the drive shaft 8.

The gearbox 9 comprises a primary shaft 14, a secondary shaft 15, which is arranged parallel to and beside the primary shaft 14, and a plurality of pairs of gears 16 and 17, each of which has a corresponding gear ratio and comprises a primary gear 16, which is mounted rigidly on the primary shaft 14, and a secondary gear 17, which is mounted idle on the secondary shaft 15 and meshes, in a permanent manner, with the primary gear 16. Furthermore, the gearbox 9 comprises a pair of servo-assisted locking devices (not shown), each of which is mounted on the secondary shaft 15 and is suited to be operated so as to alternatively lock two corresponding secondary gears 17 to the secondary shaft 15. According to an alternative (and perfectly equivalent) embodiment, which is not shown herein, the primary gears 16 are mounted idle on the primary shaft 14, the secondary gears 17 are mounted rigidly on the secondary shaft 15, and the servo-assisted locking devices are mounted coaxial to the primary shaft 14 to lock, in an alternative manner, the corresponding primary gears 16 to the primary shaft 14. According to a further (and perfectly equivalent) embodiment, which is not shown herein, some (for example two) primary gears 16 are mounted idle on the primary shaft 14 (consequently, the corresponding secondary gears 17 are mounted rigidly on the secondary shaft 15) and other (for example two) primary gears 16 are mounted rigidly on the primary shaft 14 (consequently, the corresponding secondary gears 17 are mounted idle on the secondary shaft 15); in this embodiment, at least one servo-assisted locking device (for example one single servo-assisted locking device for two idle primary gears 16) is mounted coaxial to the primary shaft 14 to alternatively lock the corresponding primary gears 16 to the primary shaft 14 and at least one servo-assisted locking device (for example one single servo-assisted locking device for two idle secondary gears 17) is mounted coaxial to the secondary shaft 15 to alternatively lock the corresponding secondary gears 17 to the secondary shaft 15.

By way of example, the gearbox 9 comprises four pairs of gears 16 and 17 and two locking devices (preferably, though not necessarily, one locking device is coaxial to the secondary shaft 15 and the other locking device is coaxial to the primary shaft 14); as a consequence, the gearbox 9 can transmit the motion between the primary shaft and the secondary shaft 15 with four different gear ratios. Obviously, the gearbox could comprise a different number of pair of gears 16 and 17 and of locking devices; for example two to six pairs of gears 16 and 17 and, therefore, one to three locking devices (one locking device for one or two pairs of gears 16 and 17, two locking devices for three of four pairs of gears 16 and 17, three locking devices for five or six pairs of gears 16 and 17).

Each locking device of the gearbox 9 is servo-assisted, i.e. it is mechanically coupled to an actuator (a hydraulic or electric actuator), which acts upon the locking device to move the locking device between an intermediate idle position, in which the locking device does not lock any secondary gear 17 to the secondary shaft 15, and two locking positions, in each of which the locking device locks a corresponding secondary gear 17 to the secondary shaft 15.

The automatic manual transmission 7 comprises a drive device 18 with a variable gear ratio, which can be adjusted so as to have two different gear ratios and is arranged immediately downstream of the secondary shaft 15 of the gearbox 9 (namely, the secondary shaft 15 of the gearbox 9 directly transmits the motion to a input of the drive device 18). According to a preferred embodiment, the two gear ratios of the drive device 18 and the gear ratios of the pairs of gears 16 and 17 of the gearbox 9 have values that are such that all the gears that can be obtained by combining any gear ratio of the drive device 18 with any gear ratio of the gearbox 9 have different gear ratios without overlaps (namely, without generating identical or very similar gear ratios).

The drive device 18 comprises an input shaft 19, which is angularly integral to the secondary shaft 15 of the gearbox 9 in direct drive (it is important to point out that the input shaft 19, at first, can be separate from and independent of the secondary shaft 15, or the input shaft 19 can be a continuation, without interruptions, of the secondary shaft 15), an output shaft 20, which is arranged parallel and next to the input shaft 19; and two pairs of gears 21 and 22, each of which has a corresponding gear ratio and comprises an input gear 21, which is mounted rigidly on the input shaft 19, and an output gear 22, which is mounted idle on the output shaft 20 and meshes with the input gear 21 in a permanent manner.

Furthermore, the drive device 18 comprises a servo-assisted locking device 23, which is mounted on the output shaft 20 and is suited to be actuated so as to alternatively lock the two output gears 22 to the output shaft 20. According to an alternative (and perfectly equivalent) embodiment, which is not shown herein, the input gears 21 are mounted idle on the input shaft 19, the output gears 22 are mounted rigidly on the output shaft 20, and the servo-assisted locking device 23 is mounted coaxial to the input shaft 19 to lock, in an alternative manner, the two input gears 21 to the input shaft 19. The locking device 23 of the drive device 18 is servo-assisted, i.e. it is mechanically coupled to an actuator (a hydraulic or electric actuator), which acts upon the locking device 23 to move the locking device 23 between an intermediate idle position, in which the locking device 23 does not lock any output gear 22 to the output shaft 20, and two locking positions, in each of which the locking device 23 locks a corresponding output gear 22 to the output shaft 20.

The clutch 11 is arranged immediately downstream of drive device 18 and is interposed between the output shaft 20 of drive device 18 and a drive shaft 24, which transmits the motion to a differential gear 25, to which the axle shafts 10 are directly connected. The clutch 11 comprises a bell 26, which is mounted so as to be rotary and is angularly integral to the output shaft 20 of the drive device 18, and a hub 27, which is mounted so as to be rotary, is arranged on the inside of and coaxial to the bell 26 and is angularly integral to the drive shaft 24. The bell 26 houses, on the inside, a pack 28 of discs, which consists of a plurality of discs, which are angularly integral to the bell 26, and of a plurality of discs, which are angularly integral to the hub 27 and are alternated with the discs that are integral to the bell 26. The clutch 11 is servo-assisted, i.e. it is mechanically coupled to an actuator (a hydraulic or electric actuator), which acts upon the clutch 11 to move clutch 11 between an open position (in which clutch 11 separates the drive shaft 24 from the output shaft 20 of the drive device 18) and a closed position (in which clutch 11 connects the drive shaft 24 and the output shaft 20 of the drive device 18 to one another).

According to a preferred—though not binding—embodiment shown in the accompanying figures, the output shaft 20 of the drive device 18 is hollow on the inside (i.e. it has a tubular shape) and the drive shaft 24 is arranged on the inside of the output shaft 20 close to the clutch 11. In other words, the drive shaft 24 extends through the output shaft 20 of the drive device 18, on the inside thereof and from side to side, so as to be engage the clutch 11.

The automatic manual transmission 7 comprises an auxiliary shaft 29, along which the electrical machine 12 is mounted. The auxiliary shaft 29 is connected to the drive shaft 24 by means of a first connectable/disconnectable and servo-assisted connection device 30 having its own gear ratio; in other words, the connection device 30 can be controlled so as to establish or not to establish a mechanical connection between the auxiliary shaft 29 and the drive shaft 24 with a predetermined gear ratio. The connection device 30 comprises a pair of gears 31 and 32 consisting of a gear 31, which is mounted idle on the auxiliary shaft 29, and a gear 32, which is mounted rigidly on the drive shaft 24 and meshes with the gear 31 in a permanent manner. According to a possible embodiment, a single idler gear or a double idler gear could be interposed between the gears 31 and 32; therefore, the gear 31 meshes directly (without the interposition of idler gears) or indirectly (with the interposition of at least one idler gear) with the gear 32.

Furthermore, the connection device 30 comprises a servo-assisted locking device 33, which is mounted on the auxiliary shaft 29 and is suited to be actuated so as to alternatively lock the gear 31 to the auxiliary shaft 29. According to an alternative (and perfectly equivalent) embodiment, which is not shown herein, the gear 31 is mounted rigidly on the auxiliary shaft 29, the gear 32 is mounted idle on the drive shaft 24, and the servo-assisted locking device 33 is mounted coaxial to the drive shaft 24 to lock the gears 3 to the drive shaft 24. The locking device 33 of the connection device 30 is servo-assisted, i.e. it is mechanically coupled to an actuator (a hydraulic or electric actuator), which acts upon the locking device 33 to move the locking device 33 between an intermediate idle position, in which the locking device 33 does not lock the gear 31 to the auxiliary shaft 29, and a locking positions, in which the locking device 33 locks a the gear 31 to the auxiliary shaft 29.

The auxiliary shaft 29 also is connected to the secondary shaft 15 of the gearbox 9 by means of a connectable/disconnectable and servo-assisted connection device 34 having its own gear ratio; in other words, the connection device 34 can be controlled so as to establish or not to establish a mechanical connection between the auxiliary shaft 29 and the secondary shaft 15 of the gearbox 9 with a predetermined gear ratio. The connection device 34 comprises a pair of gears 35 and 36 consisting of a gear 35, which is mounted idle on the auxiliary shaft 29, and a gear 36, which is mounted rigidly on a connection shaft 37 and meshes with the gear 35 in a permanent manner.

Furthermore, the connection device 34 uses the locking device 33 of the connection device 30, which is mounted on the auxiliary shaft 29 and is suited to be actuated to lock the gear 35 to the auxiliary shaft 29; in other words, there is one single locking device 33, which is shared by the two connection devices 30 and 34 and, therefore, is used by both connection devices 30 and 34. According to an alternative (and perfectly equivalent) embodiment, which is not shown herein, the connection device 34 comprises its own locking device, which is separate from and independent of the locking device 33 of the connection device 30; in the embodiment, the locking device of the connection device can be mounted on the auxiliary shaft 29 or on the connection shaft 37.

Finally, the connection device 34 comprises a pair of gears 38 and 39 consisting of a gear 38, which is mounted rigidly on the connection shaft 37, and a gear 39, which is mounted rigidly on the secondary shaft 15 of the gearbox 9 and meshes with the gear 38 in a permanent manner.

According to an alternative (and perfectly equivalent) embodiment, which is not shown herein, the connection device 34 is not provided with the connection shaft 37 (and, therefore, with the gears 36 and 38) and the gear 35 meshes directly and in a permanent manner with the gear 39 (as an alternative, a further connection device, mounted idle, could be interposed between the two gears 35 and 39).

Finally, the automatic manual transmission 7 comprises an electronic control unit 40 ("ECU") which monitors the operation of the automatic manual transmission 7 and, among other things, changes gears by controlling the actuators of the locking devices of the gearbox 9, the actuator of the clutch 11 and the actuators of the locking devices 23 and 33 in a coordinated and completely "transparent" manner for the driver (i.e. the driver sends only one request to change gears without any type of direct control over which actuators are actually used to change gears). Moreover, the control unit 40 controls the electrical machine 12 to determine when and how the electrical machine 12 is to operate (i.e. whether as an engine or as a generator) and simultaneously controls the actuators to determine the mode for mechanically connecting the electrical machine 12.

According to a possible embodiment, in order to perform, in sequence, all the upshifts from the shortest gear (i.e. the first gear—1st gear) to the longest gear (i.e. the eighth gear—8th gear), the control unit 40 activates, with each gear shift, the actuator of the locking device 23 so as to vary the gear ratio of the drive device 18, and activates in an alternate manner, i.e. with one gear shift not and with the following gear shift yes, the actuators of the locking devices of the gearbox 9 so as to vary the engaged pair of gears 16 and 17. According to an alternative embodiment, in order to perform, in sequence, all the upshifts from the shortest gear (i.e. the first gear—1st gear) to the longest gear (i.e. the eighth gear—8th gear), the control unit 40 activates, with each gear shift, the actuators of the locking devices of the gearbox 9 so as to vary the engaged pair of gears 16 and 17, and activates in an alternate manner, i.e. with one gear shift not and with the following gear shift yes, the actuator of the locking device 23 so as to vary the gear ratio of the drive device 18. According to a further embodiment, all the gears are divided into a lower group (comprising the four gears between the first gear—1st gear—and the fourth gear—4th gear) and an upper group (comprising the four gears between the fifth gear—5th gear—and the eighth gear—8th gear), so that the longest gear of the lower group (i.e. the fourth gear—4th gear) has a shorter gear ratio compared to the shortest gear of the upper group (i.e. the fifth gear—5th gear). In order to perform a gear shift within a same group (i.e. between two gears belonging to a same group), the control unit 40 exclusively activates the actuators of the locking devices of the gearbox 9 so as to vary the engaged pair of gears 16 and 17 of the gearbox 9. On the other hand, in order to perform a gear shift between a gear of the lower group and a gear of the upper group, the control unit 40 simultaneously activates the actuators of the locking devices of the gearbox 9, so as to vary the engaged pair of gears 16 and 17 of gearbox 9, and the actuator of the locking device 23, so as to vary the gear ratio of the drive device 18.

Clearly, the control unit 40 opens the clutch 11 before controlling the actuator of the locking device 23 to vary the gear ratio of the drive device 18 and/or the actuators of the locking devices of the gearbox 9 to vary the engaged pair of gears 16 and 17; in the same way, the control unit 40 closes the clutch 11 after having controlled the actuator of the locking device 23 to vary the gear ratio of the drive device 18 and/or the actuators of the locking devices of the gearbox 9 to vary the engaged pair of gears 16 and 17.

Described below are some possible operating modes of the automatic manual transmission 7 and of the electrical machine 12. It should be pointed out that some operating modes of the automatic manual transmission 7 and of the electrical machine 12 are described below by way of example and, therefore, it is also possible for other operating modes of the automatic manual transmission 7 and of the electrical machine 12 to exist and/or that not all these operating modes of the automatic manual transmission 7 and of the electrical machine 12 are actually used in practice.

Figure 3:
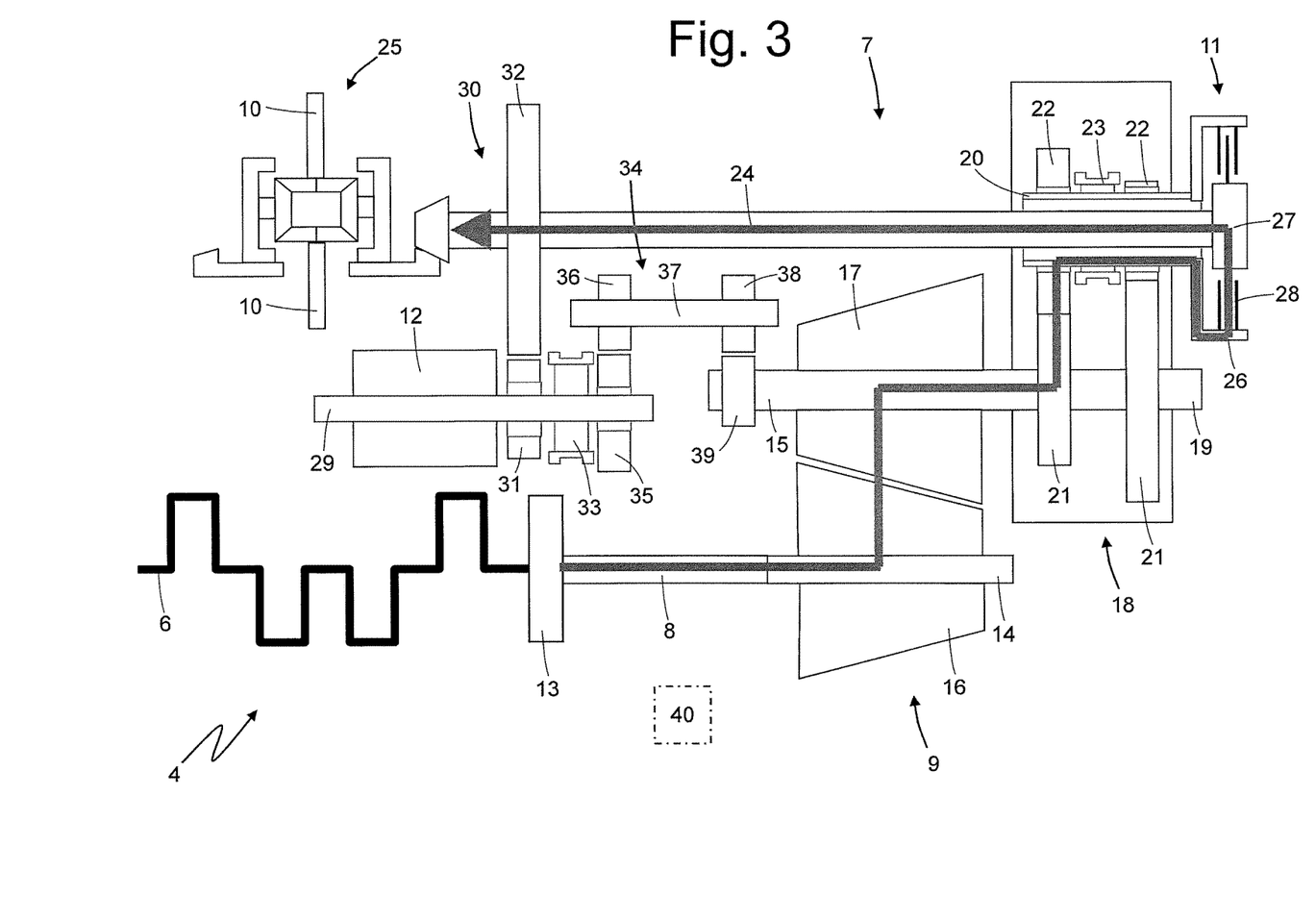
FIGS. 3-12 schematically show different operating modes of the automatic manual transmission of FIG. 2.

FIG. 3 shows the path of the torque when the electrical machine 12 is deactivated (namely, when the torque is entirely generated by the internal combustion engine 5 and, therefore, the car 1 is in a merely thermal operating mode) and the shortest gear ratio is selected in the drive device 18 (namely, the gear ratio that, given the same speed of rotation of the input shaft 19, causes the output shaft 20 to rotate more quickly). According to FIG. 3, a gear is selected in the gearbox 9 (namely, the two shafts 14 and 15 of the gearbox 9 are angularly integral to one another so as to transmits the movement through the gearbox 9), the shortest gear ratio is selected in the drive device 18 (namely, the two shafts 19 and 20 of the drive device 18 are angularly integral to one another so as to transmit the movement through the drive device 18), the clutch 11 is closed, and the two connection devices 30 and 34 are open (namely, the auxiliary shaft 29 is not connected either to the drive shaft 24 or to the secondary shaft 15 of the gearbox).

Figure 4:
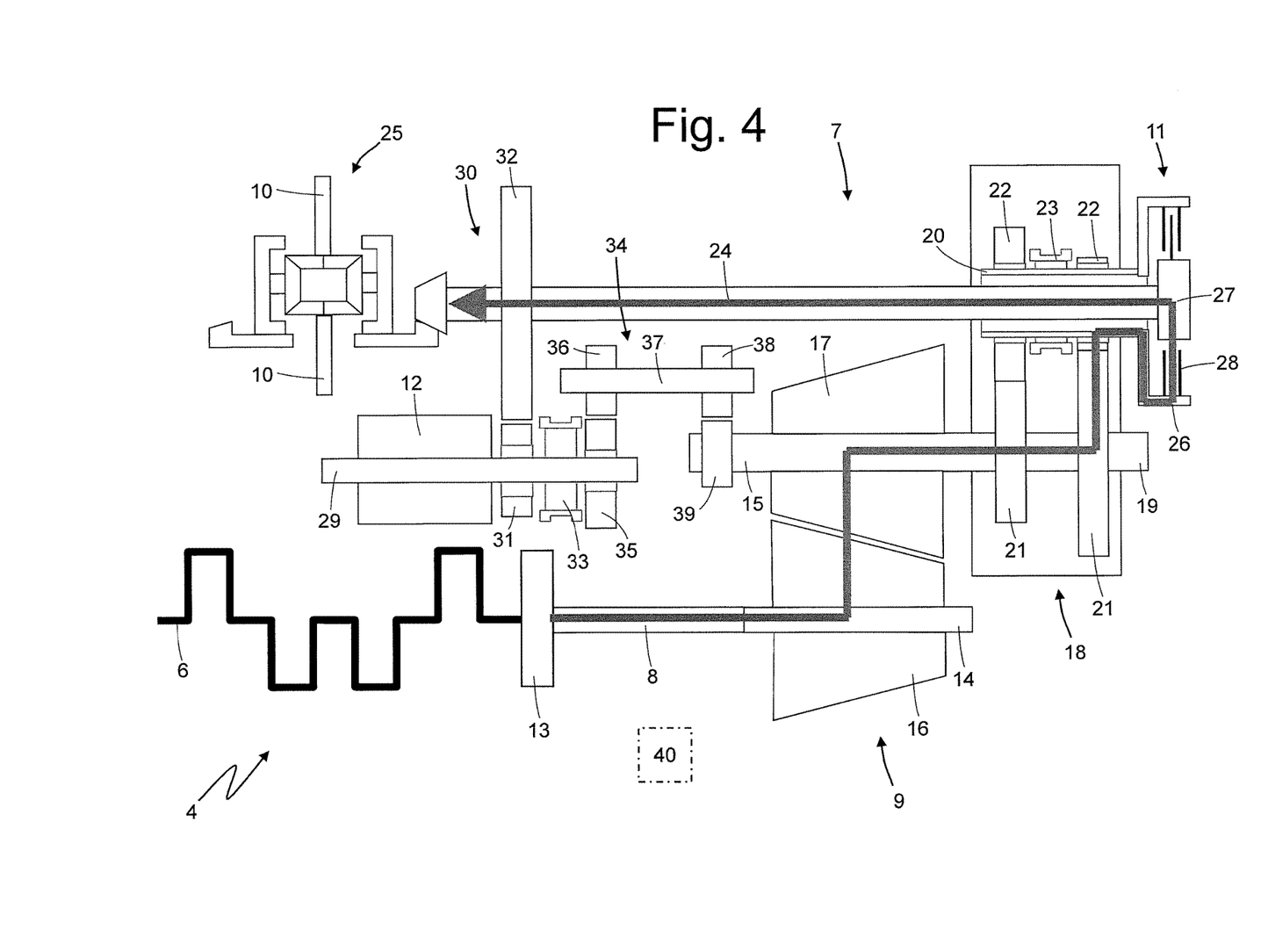

FIG. 4 shows the path of the torque when the electrical machine 12 is deactivated (namely, when the torque is entirely generated by the internal combustion engine 5 and, therefore, the car 1 performs a merely thermal movement) and the longest gear ratio is selected in the drive device 18 (namely, the gear ratio that, given the same speed of rotation of the input shaft 19, causes the output shaft 20 to rotate more slowly). Otherwise, the drawing of FIG. 4 is similar to the one shown in FIG. 3.

Figure 5:
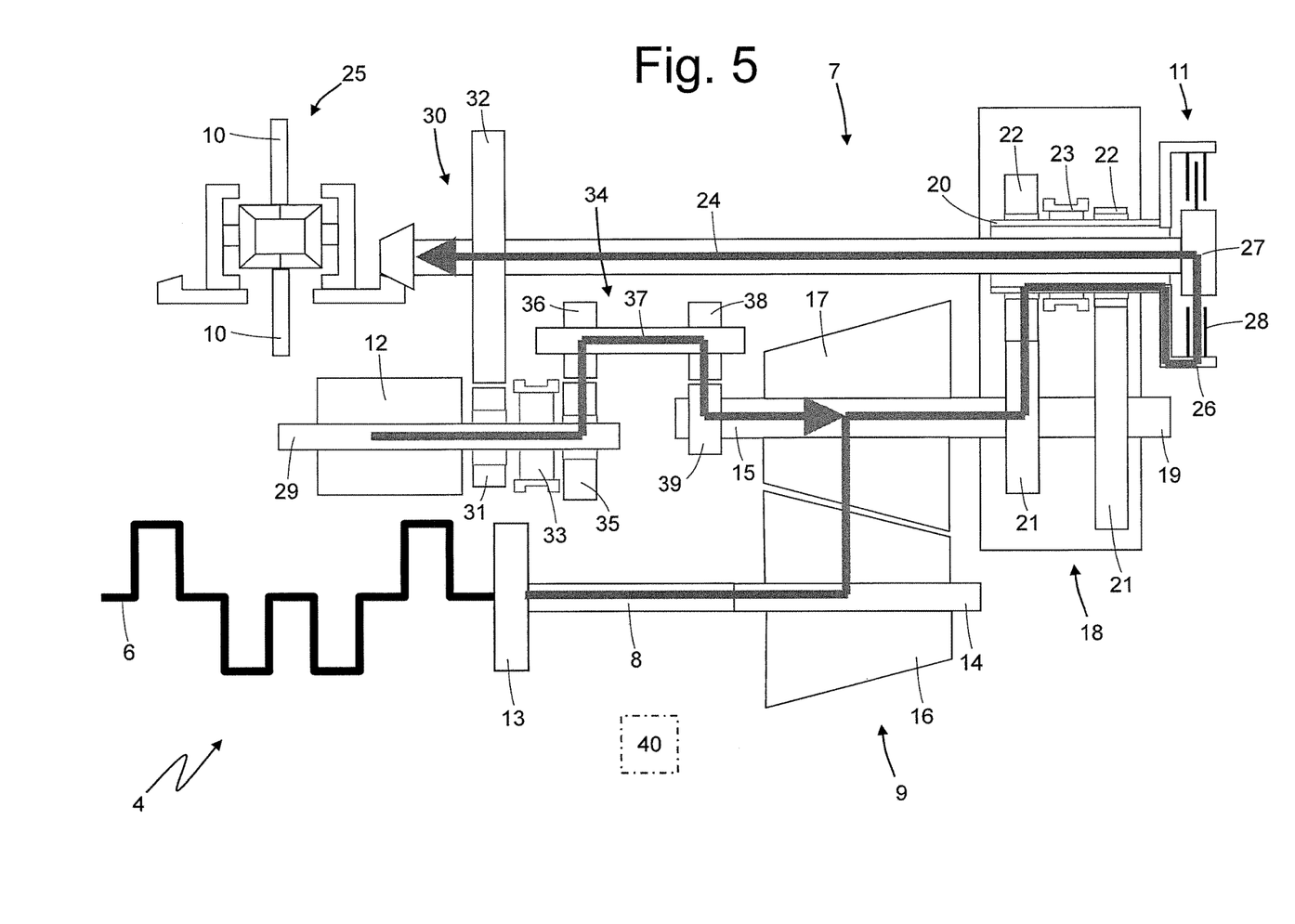
Figure 6:
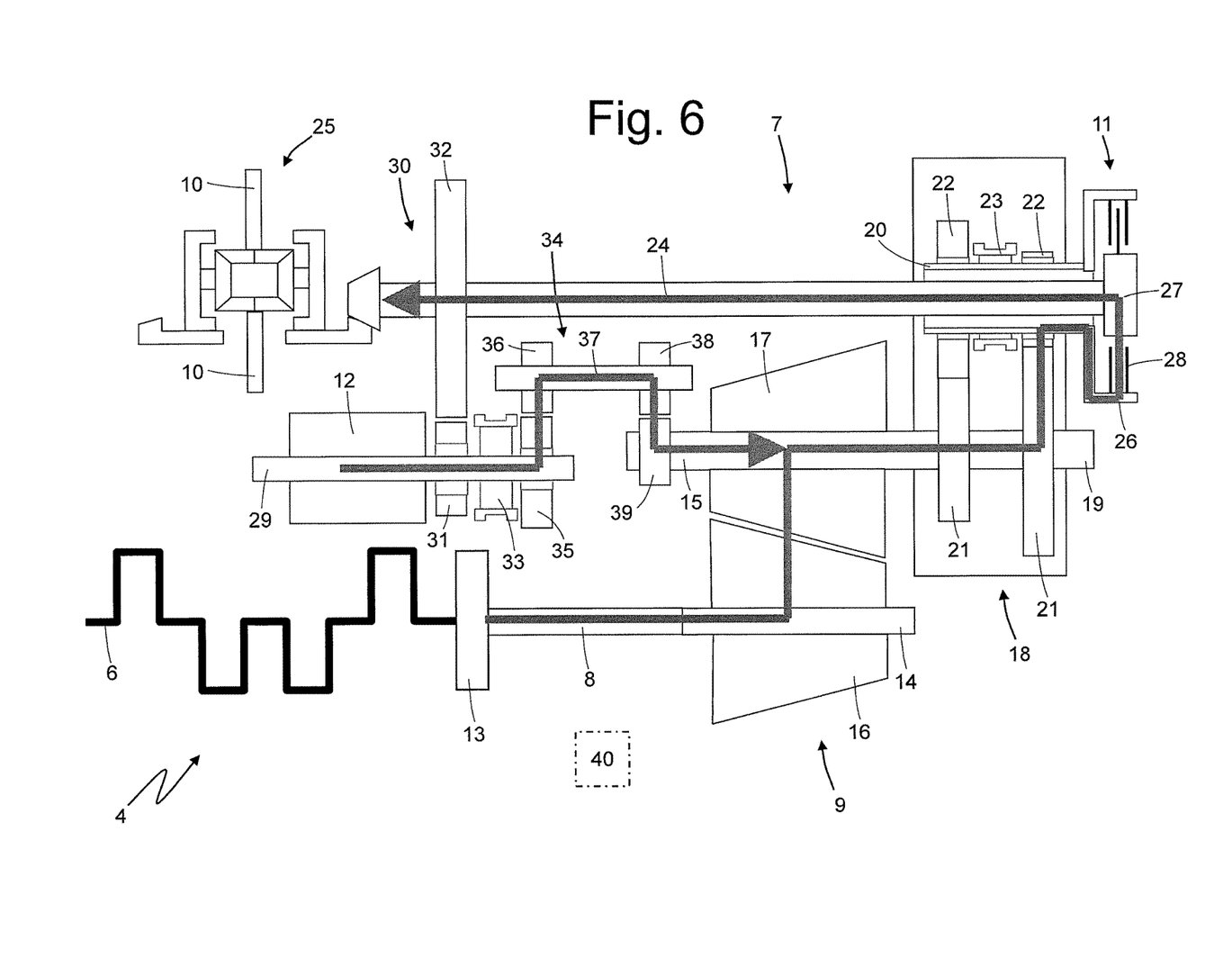

FIGS. 5 and 6 show the path of the torque when the electrical machine 12 is active and is connected to the rear driving wheels 3 through the connection device 34 (namely, through the drive device 18); in this case, the car 1 is in a hybrid operating mode. The only difference between FIGS. 5 and 6 lies in the fact that, in FIG. 5, the shortest gear ratio is selected in the drive device 18, whereas, in FIG. 6, the longest gear ratio is selected in the drive device 18. According to FIGS. 5 and 6, a gear is selected in the gearbox 9 (namely, the two shafts 14 and 15 of the gearbox 9 are angularly integral to one another so as to transmits the movement through the gearbox 9), the shortest or the longest gear ratio is selected in the drive device 18 (namely, the two shafts 19 and 20 of the drive device 18 are angularly integral to one another so as to transmit the movement through the drive device 18), the clutch 11 is closed, the connection device 30 is open (namely, the auxiliary shaft 29 is not connected to the drive shaft 24), and the connection device 34 is closed (namely, the auxiliary shaft 29 is angularly integral to the secondary shaft 15 of the gearbox). In this situation, the rear driving wheels 3 can receive a torque generated by electrical machine 12 and by the internal combustion engine 5 (as indicated by the arrows in FIGS. 5 and 6), or the rear driving wheels 3 can receive a braking torque due to the electrical machine 12, which operates in a regenerative mode (namely, it operates as an electrical generator, which absorbs mechanical power and releases electrical power), and/or to the dragging of the internal combustion engine 5 in cut-off.

Figure 7:
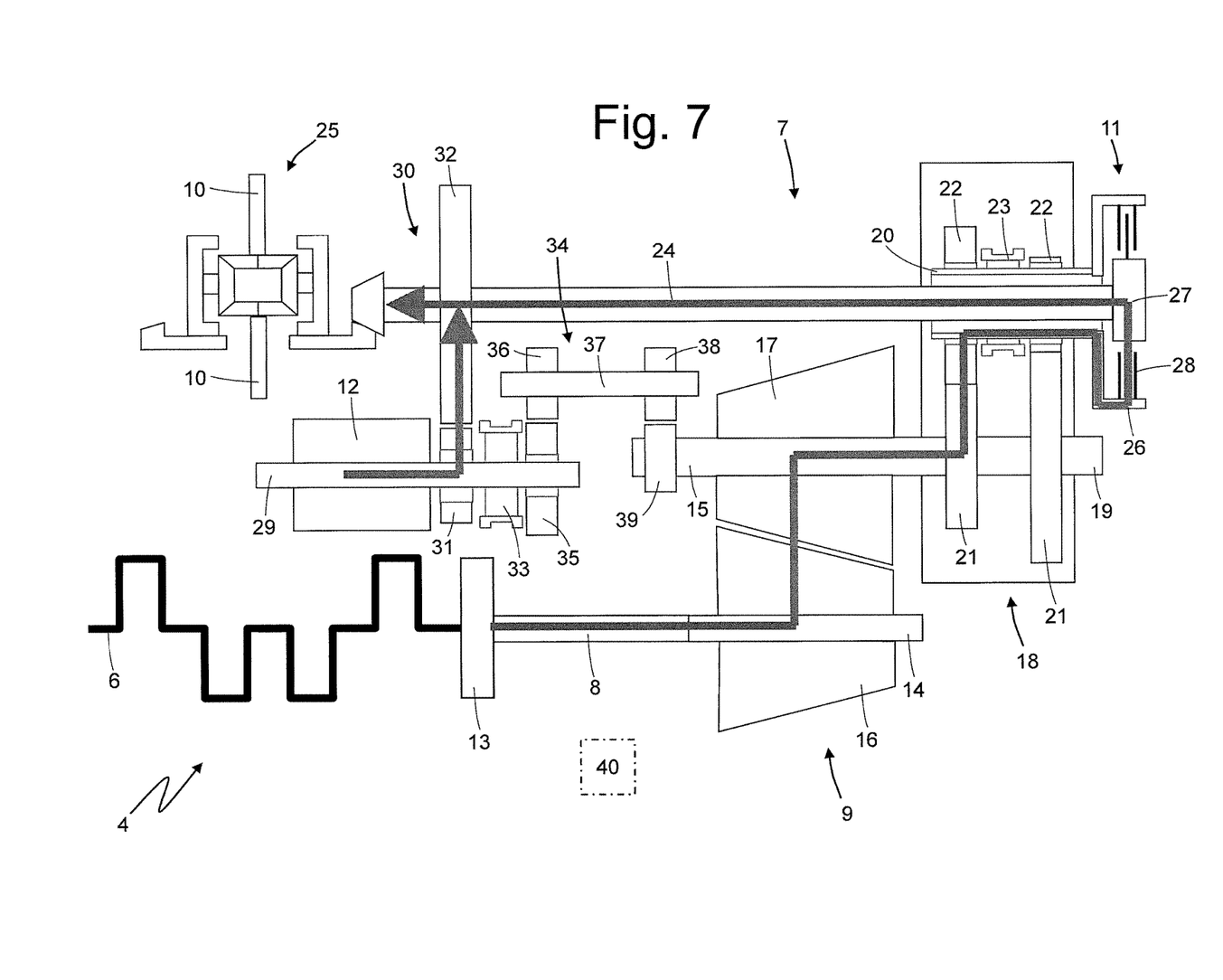

FIG. 7 shows the path of the torque when the electrical machine 12 is active and is connected to the rear driving wheels 3 through the connection device 30 (namely, bypassing the drive device 18); in this case, the car 1 is in a hybrid operating mode. According to FIG. 7, a gear is selected in the gearbox 9 (namely, the two shafts 14 and 15 of the gearbox 9 are angularly integral to one another so as to transmits the movement through the gearbox 9), the shortest or the longest gear ratio is selected in the drive device 18 (namely, the two shafts 19 and 20 of the drive device 18 are angularly integral to one another so as to transmit the movement through the drive device 18), the clutch 11 is closed, the connection device 30 is closed (namely, the auxiliary shaft 29 is angularly integral to the drive shaft 24), and the connection device 34 is open (namely, the auxiliary shaft 29 is not connected to the secondary shaft 15 of the gearbox). In this situation, the rear driving wheels 3 can receive a torque generated by electrical machine 12 and by the internal combustion engine 5 (as indicated by the arrows in FIG. 7), or the rear driving wheels 3 can receive a braking torque due to the electrical machine 12, which operates in a regenerative mode (namely, it operates as an electrical generator, which absorbs mechanical power and releases electrical power), and/or to the dragging of the internal combustion engine 5 in cut-off.

Figure 8:
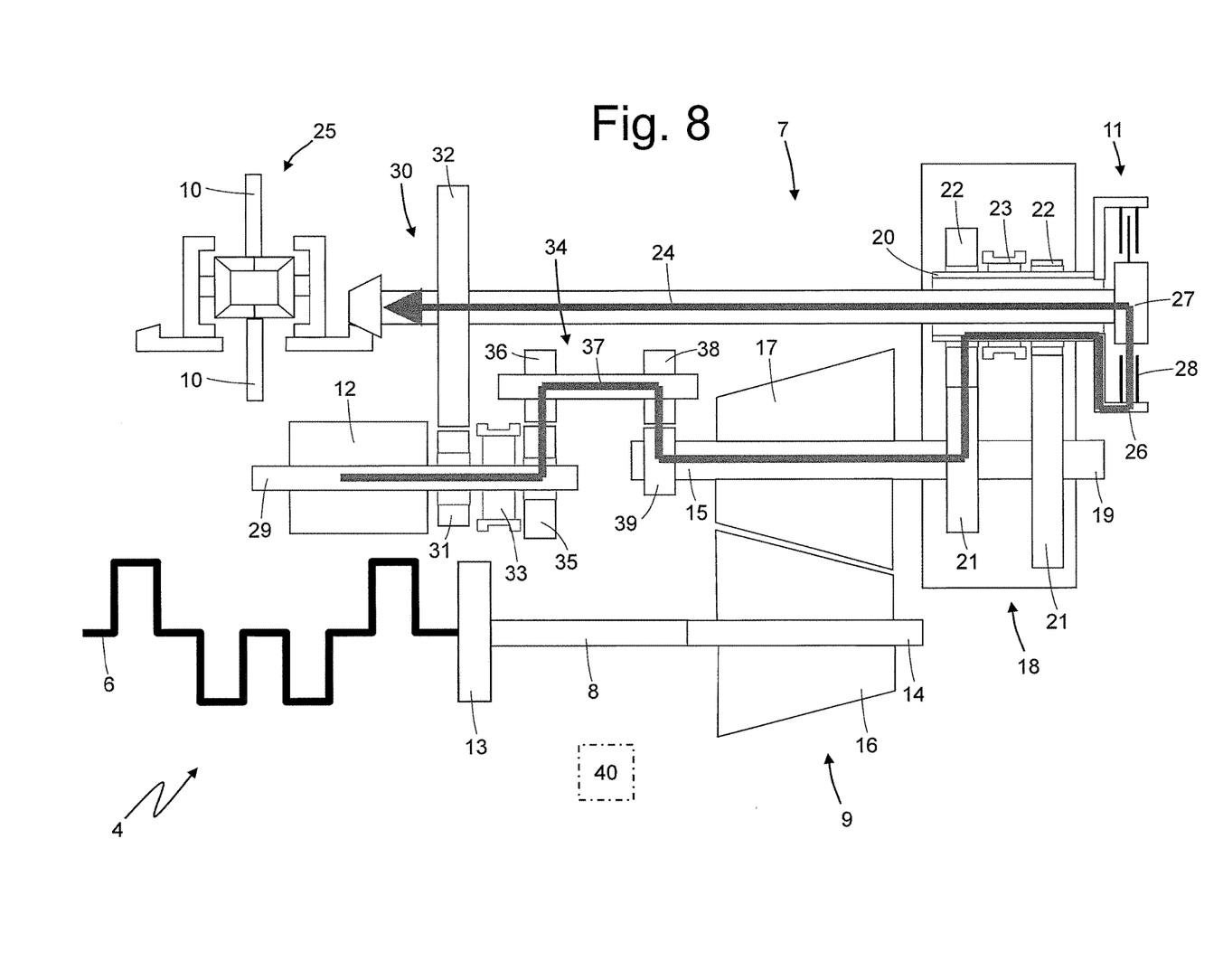
Figure 9:
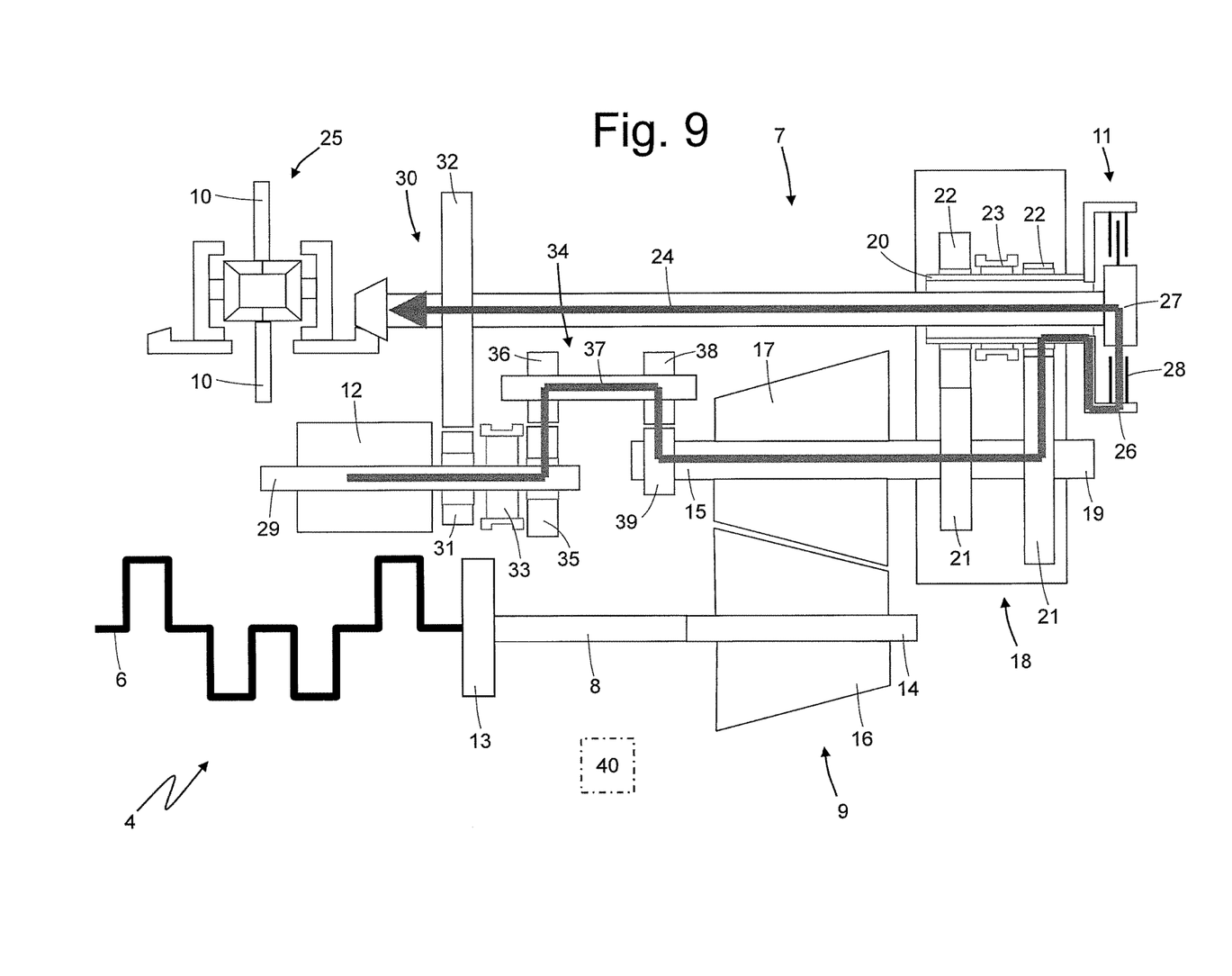

FIGS. 8 and 9 show the path of the torque when the sole electrical machine 12 is active and is connected to the rear driving wheels 3 through the connection device 34 (namely, through the drive device 18); in this case, the car 1 is in a merely electric operating mode. The only difference between FIGS. 8 and 9 lies in the fact that, in FIG. 8, the shortest gear ratio is selected in the drive device 18, whereas, in FIG. 9, the longest gear ratio is selected in the drive device 18. According to FIGS. 8 and 9, the gearbox 9 is in a neutral position (namely, the two shafts 14 and 15 of the gearbox 9 are not angularly integral to one another so as to avoid transmitting the movement through the gearbox 9), the shortest or the longest gear ratio is selected in the drive device 18 (namely, the two shafts 19 and 20 of the drive device 18 are angularly integral to one another so as to transmit the movement through the drive device 18), the clutch 11 is closed, the connection device 30 is open (namely, the auxiliary shaft 29 is not connected to the drive shaft 24), and the connection device 34 is closed (namely, the auxiliary shaft 29 is angularly integral to the secondary shaft 15 of the gearbox). In this situation, the rear driving wheels 3 can receive a torque generated by electrical machine 12 (as indicated by the arrows in FIGS. 8 and 9), or the rear driving wheels 3 can receive a braking torque due to the electrical machine 12, which operates in a regenerative mode (namely, it operates as an electrical generator, which absorbs mechanical power and releases electrical power).

Figure 10:
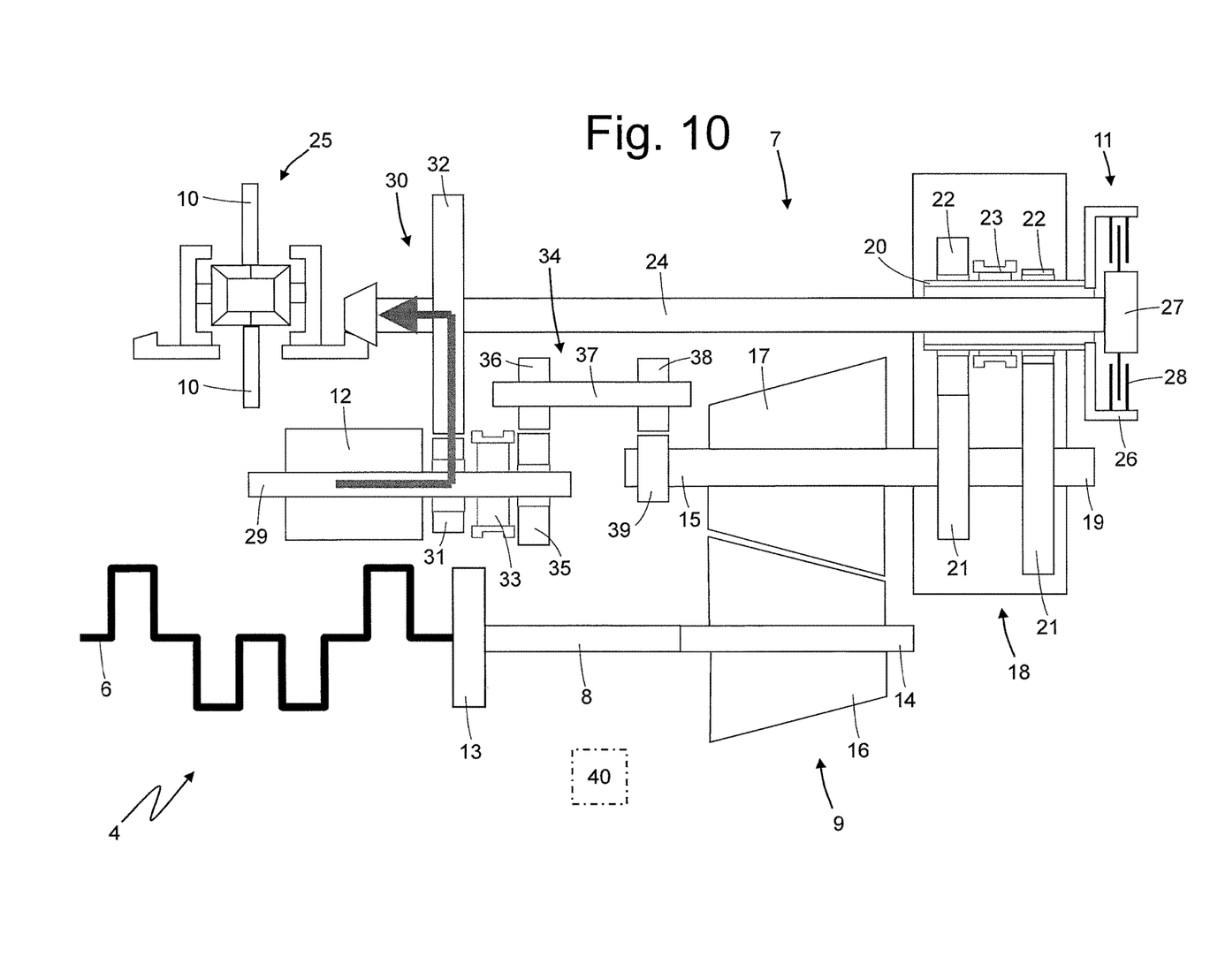

FIG. 10 shows the path of the torque when the sole electrical machine 12 is active and is connected to the rear driving wheels 3 through the connection device 30 (namely, bypassing the drive device 18); in this case, the car 1 is in a merely electric operating mode. According to FIG. 10, the gearbox 9 is in a neutral position (namely, the two shafts 14 and 15 of the gearbox 9 are not angularly integral to one another so as to avoid transmitting the movement through the gearbox 9), the drive device 18 is in a neutral position (namely, the two shafts 19 and 20 of the drive device 18 are not angularly integral to one another so as to avoid transmitting the movement through the drive device 18), the clutch 11 is open, the connection device 30 is closed (namely, the auxiliary shaft 29 is angularly integral to the drive shaft 24), and the connection device 34 is open (namely, the auxiliary shaft 29 is not connected to the secondary shaft 15 of the gearbox). In this situation, the rear driving wheels 3 can receive a torque generated by electrical machine 12 (as indicated by the arrow in FIG. 10), or the rear driving wheels 3 can receive a braking torque due to the electrical machine 12, which operates in a regenerative mode (namely, it operates as an electrical generator, which absorbs mechanical power and releases electrical power).

Figure 11:
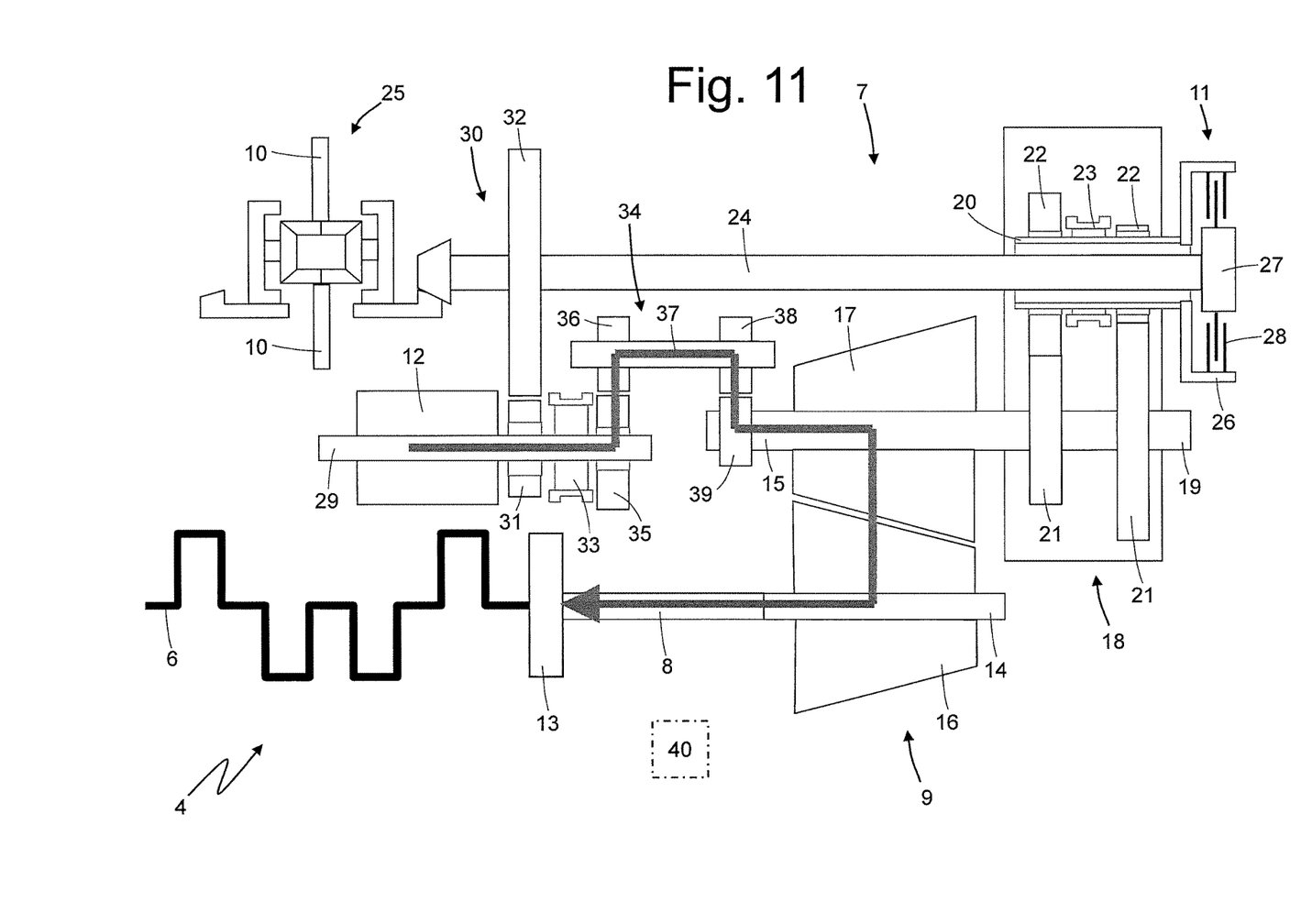
Figure 12:
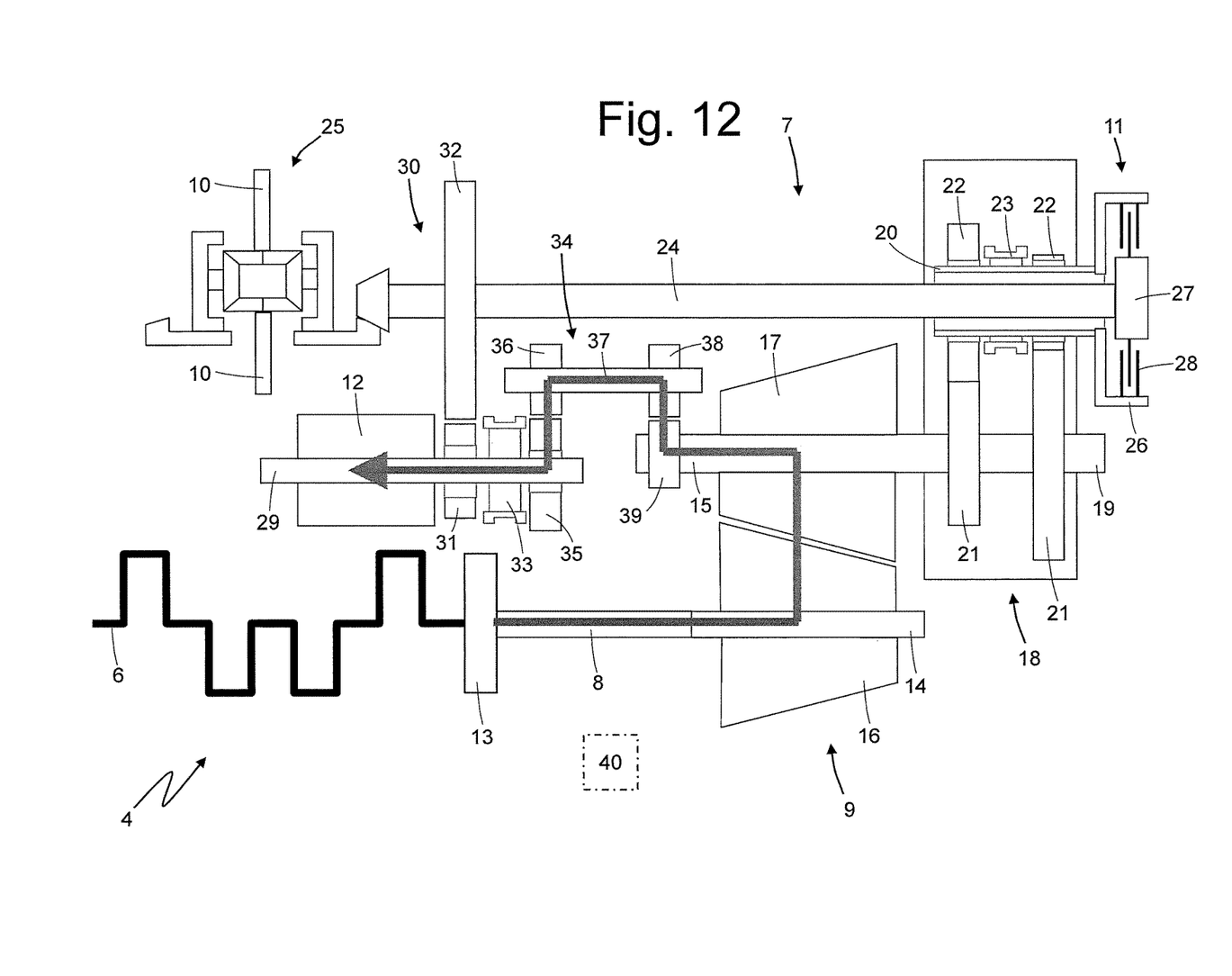

FIG. 11 shows an operating mode in which, when the car 1 is in s stationary condition, the internal combustion engine 5 is started using the torque developed by the electrical machine 12, which is caused to operate as an engine. According to FIG. 11, a gear is selected in the gearbox 9 (namely, the two shafts 14 and 15 of the gearbox 9 are angularly integral to one another so as to transmits the movement through the gearbox 9), the drive device 18 is in a neutral position (namely, the two shafts 19 and 20 of the drive device 18 are not angularly integral to one another), the clutch 11 is open, the connection device 30 is open (namely, the auxiliary shaft 29 is not connected to the drive shaft 24), and the connection device 34 is closed (namely, the auxiliary shaft 29 is angularly integral to the secondary shaft 15 of the gearbox). With the same operating mode and as shown in FIG. 12, the electrical machine 12 can be caused to operate as a generator, so as to recharge the electrical energy storage system exploiting the torque generated by the internal combustion engine 5 while the vehicle 1 is in a stationary condition.

By making good use of the operating modes described in FIGS. 5, 6 and 7, one can obtain a full-speed starting of the internal combustion engine 5 using the torque developed by the electrical machine 12, which is caused to operate as an engine so as to simultaneously obtain both the starting of the internal combustion engine 5 and the moving of the car 1.

According to a preferred embodiment, the electrical machine 12 is caused to operate as an engine to carry out the reverse movement of car 1 (the direction of rotation of the electrical machine 12 is easily reversible) and, therefore, the reverse gear is not provided in gearbox 9. Furthermore, according to a preferred embodiment, the electrical machine 12 is caused to operate as an engine to compensate for the "torque gap" to the rear driving wheels when clutch 11 is opened to vary the gear ratio of gearbox 9 and/or of the drive device 18.

In the embodiment shown in the accompanying figures, the clutch 11 is arranged in an unconventional position (i.e. downstream of the secondary shaft 15 of gearbox 9 between gearbox 9 and the differential gear 25), in which it causes no kind of geometrical restraint on crankshaft 6 and on flywheel 13 (when the internal combustion engine 5 and the gearbox 9 are arranged beside one another); by so doing, it is possible to reduce the vertical volumes in the area of the flywheel 13 and, therefore, it is possible to lower the entire internal combustion engine 5, thus lowering the barycentre of the car 1.

According to a different embodiment, which is not shown herein, there is no drive device 18 and, hence, the gears are exclusively determined by gearbox 9.

In the embodiment shown in the accompanying figures, the internal combustion engine 5 is arranged in a front position, the transmission is rear, and the gearbox 9 as well as the clutch 11 are arranged in a rear position; according to alternative and perfectly equivalent embodiments, which are not shown herein, the internal combustion engine 5 can be arranged in a central or rear position, the transmission can be front or a four-wheel drive, and the gearbox 9 as well as the clutch 11 can be arranged in a front position (obviously, only when the internal combustion engine 5 is also arranged in a front position).

The automatic manual transmission 7 described above has several advantages as it allows an increased number of gears to be obtained within contained size, weight and costs and, at the same time, it allows the electrical machine 12 to be mechanically connected to cause the car 1 to be hybrid, so that the electrical machine 12 can effectively and energy-efficiently carry out various functions.

In particular, by overlapping the gear ratio series of gearbox 9, the drive device 18 with a variable gear ratio acts as a multiplier and allows the number of gears to be multiplied while at the same time containing the number of pairs of gears 16 and 17 and of locking devices 18 of the gearbox 9. For example, in the embodiment shown in the accompanying figures, the two-ratio drive device 18 globally allows an eight-gear automatic manual transmission 7 to be obtained with only four pairs of gears 16 and 17 and two locking devices of the gearbox 9; the drive device 18 comprises two pairs of gears 21 and 22 and the locking device 23 and, therefore, the eight-gear automatic manual transmission 7 comprises, overall, fives pairs of gears and three locking devices. A similar conventional eight-gear automatic manual transmission would consist of eight pairs of gears and four locking devices; it is therefore evident that, in the automatic manual transmission 7 described above, two pairs of gears (from eight to six) and one locking device (from four to three) are spared.

Furthermore, in the automatic manual transmission described above, the electrical machine 12 can be connected to the differential gear 25 (i.e. to the rear driving wheels 3) by means of three different gear ratios (shown in FIGS. 5, 6 and 7 and in FIGS. 8, 9 and 10); in this way, the electrical machine 12 can be caused to operate at a more favourable speed of rotation (namely, at a speed of rotation that allows a high energy efficiency to be obtained) not only when the car 1 runs at a low or medium speed, but also when the car 1 runs at a relatively high speed.

To sum up, the automatic manual transmission 7 described above enables the compactness of a transmission in which the ratios between the internal combustion engine and the wheels are the product of the number of ratios of the gearbox 9 (from 2 to 6) and a number of multiplying ratios of the drive device 18 (in the most common embodiment, there usually are two multiplying ratios, which hence double the number of ratios of the gearbox 9), but with the possibility of having more ratios between the electrical machine 9 and the differential gears 25 (i.e. the rear driving wheels 3), namely a very short ratio downstream of the clutch 11 and through the connection device 30 (used at low speeds of the car 1 for continuity in the torque delivered to the rear driving wheels 3 during gear shifts), and the number of multiplying ratios of the device device 18 (normally two) upstream of the clutch 11 and through the connection device 34. The increase in the number of ratios between the electrical machine 12 and the differential gear 25 (i.e. the rear driving wheels 3) enables better performances in the electric operating mode, as the speed of rotation of the electrical machine 12 can be made more efficient event at relative high speeds of the car 1.

The invention claimed is:

1. An automatic manual transmission for a hybrid vehicle provided with an internal combustion engine and with an electrical machine; the automatic manual transmission comprises:
   a servo-assisted mechanical gearbox, which is provided with at least one primary, shaft suited to receive a torque from a crankshaft of the internal combustion engine, and with at least one secondary shaft;
   a differential gear, which transmits the motion to driving wheels;

a clutch;

a servo-assisted drive device with a variable gear ratio, which is arranged immediately downstream of the gearbox and directly receives the motion from the secondary shaft of the gearbox;

an auxiliary shaft, along which the electrical machine is mounted;

a drive shaft connecting the differential gear to the servo-assisted drive device, a first connectable/disconnectable and servo-assisted connection device, which is suited to connect the auxiliary shaft to the drive shaft; and a second connectable/disconnectable and servo-assisted connection device, which is suited to connect the auxiliary shaft to the secondary shaft of the gearbox.

2. An automatic manual transmission according to claim 1, wherein the first connection device comprises:

a first gear, which is mounted idle on the auxiliary shaft;

a second gear, which transmits the motion to the drive shaft and meshes with the first gear in a permanent manner; and a locking device, which is mounted on the auxiliary shaft and is suited to be actuated so as to lock the first gear to the auxiliary shaft.

3. An automatic manual transmission according to claim 2, wherein the second gear is rigidly mounted on the drive shaft.

4. An automatic manual transmission according to claim 2, wherein the second connection device comprises:

a third gear, which is mounted idle on the auxiliary shaft;

a fourth gear, which transmits the motion to the secondary shaft of the gearbox and meshes with the third gear in a permanent manner; and a locking device, which is mounted on the auxiliary shaft and is suited to be actuated so as to lock the third gear to the auxiliary shaft.

5. An automatic manual transmission according to claim 4, wherein the locking device is shared by the two connection devices and is suited to be actuated so as to alternatively lock the first gear or the third gear to the auxiliary shaft.

6. An automatic manual transmission according to claim 4, wherein the fourth gear is rigidly mounted on the secondary shaft of the gearbox.

7. An automatic manual transmission according to claim 4, wherein the second connection device comprises:

a connection shaft, which is interposed between the auxiliary shaft and the secondary shaft of the gearbox and on which the fourth gear is rigidly mounted;

a fifth gear, which is rigidly mounted on the connection shaft next to the fourth gear; and a sixth gear, which is rigidly mounted on the secondary shaft of the gearbox and meshes with the fifth gear in a permanent manner.

8. An automatic manual transmission according to claim 1, wherein the clutch is arranged immediately downstream of the drive device and is interposed between the drive device and the drive shaft.

9. An automatic manual transmission according to claim 1, wherein the drive device comprises:

an input shaft, which is angularly integral to the secondary shaft of the gearbox in direct drive;

an output shaft, which is arranged parallel and next to the input shaft;

at least two pairs of gears, each of which has a corresponding gear ratio and comprises an input gear, which is mounted on the input shaft, and an output gear, which is mounted on the output shaft and meshes with the input gear in a permanent manner; and a locking device, which is mounted on the output shaft or on the input shaft and is suited to be actuated so as to alternatively lock the two output gears to the output shaft or the two input gears to the input shaft.

10. An automatic manual transmission according claim 9, wherein the clutch is arranged immediately downstream of the drive device and is interposed between the output shaft of the drive device and the drive shaft.

11. An automatic manual transmission according claim 10, wherein the output shaft of the drive device is hollow on the inside and the drive shaft is arranged on the inside of the output shaft close to the clutch.

* * * * *